March 27, 1928. 1,664,135
W. SCRIMGEOUR
CONTROL VALVE
Filed May 15, 1926 2 Sheets-Sheet 2

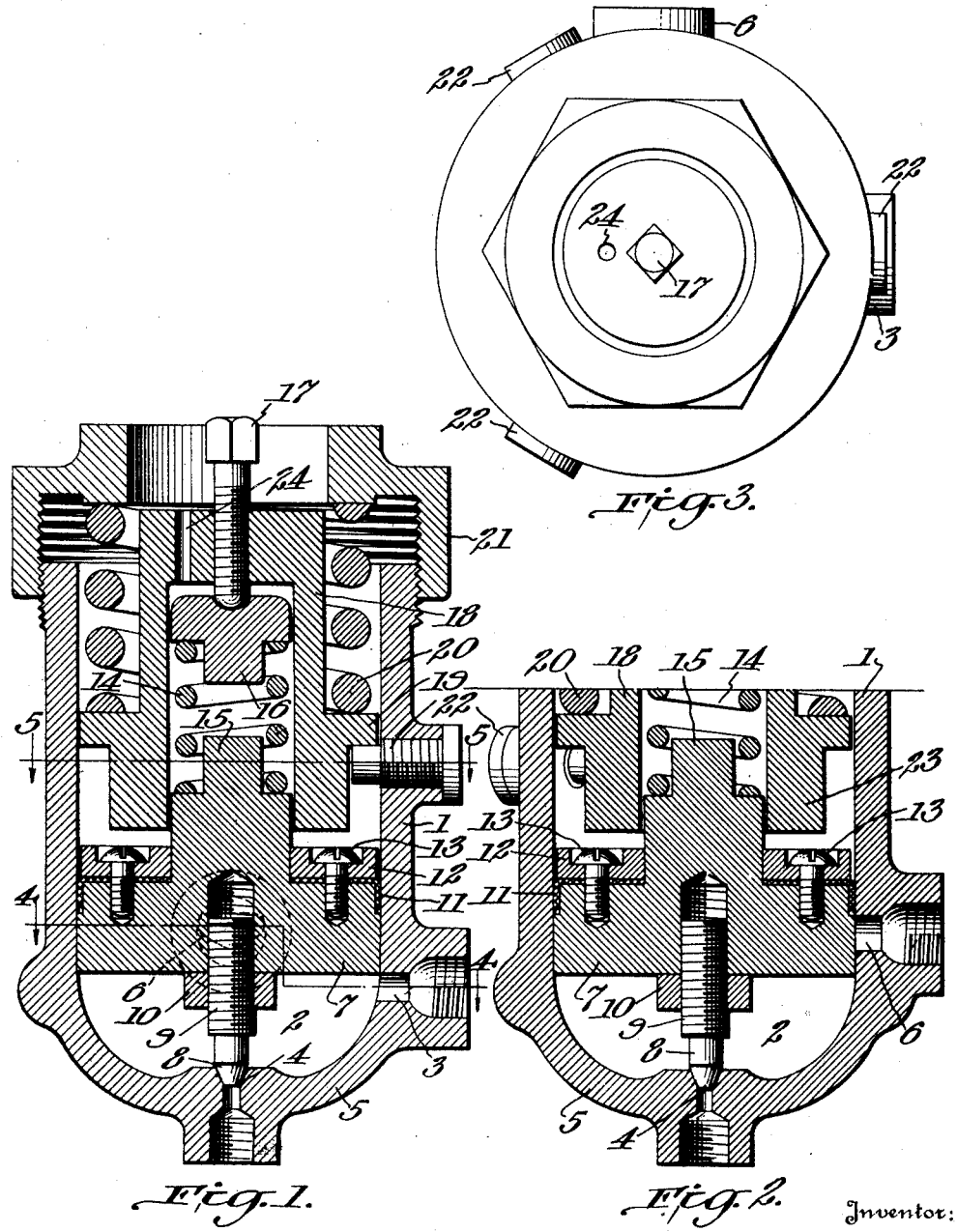

Inventor:
William Scrimgeour,
By Byrnes Townsend & Brickenstein,
Attorneys

Patented Mar. 27, 1928.

1,664,135

UNITED STATES PATENT OFFICE.

WILLIAM SCRIMGEOUR, OF WASHINGTON, DISTRICT OF COLUMBIA.

CONTROL VALVE.

Application filed May 15, 1926. Serial No. 109,331.

This invention relates to a control valve and particularly to a valve operative to perform the double function of a cut-off valve and a pressure relief valve.

While not limited thereto, the invention is particularly useful in connection with the supply of fuel oil to domestic or industrial burners. In systems supplying fuel oil under high pressure to a pulverizer or atomizer, the flow of oil from the pump or pressure line through the atomizer may not cease simultaneously with the stopping of the fuel pump. When the pressure line is of such size or length that it holds an appreciable quantity of oil, this slow escape of oil as the pressure within the line falls to atmospheric may continue for some time after the blower comes to rest. When this occurs, air is not present in quantity sufficient to complete combustion and the smoky flame may deposit carbon on the furnace walls and tubes. To prevent the feeding of excessive quantities of fuel during the operation of the burner, it is necessary to limit the rate of supply to the burner. In accordance with the present invention, the slow escape of oil from the feed line is prevented by the same device which is employed to limit the maximum supply of oil.

An object of the invention is to provide a control valve which functions as a bleed or relief valve when subjected to relatively high pressures and which moves to closing position when the inlet pressure drops to a materially lower and predetermined value. A further object of the invention is to provide a control valve having a short range of movements opposed by a relatively small force tending to close the same, and having a further range of movement during which it opens a relief port against a relatively large force. More specifically an object is to provide a valve having an outlet port and a relief port controlled by a single movable element, the construction including two springs opposing the movement of the cotnrol element by the inlet pressure of the fluid, one of said springs being continuously operative on said element and the second spring coming into play only when the element moves into position to open the relief port.

These and other objects of the invention will be apparent from the following specification when taken with the accompanying drawings, in which Fig. 1 is a vertical central section though a valve embodying the invention;

Fig. 2 is a similar central section through the lower portion of the valve, the section being taken on a plane normal to the plane of Fig. 1;

Fig. 3 is a plan view; and

Figure 4:
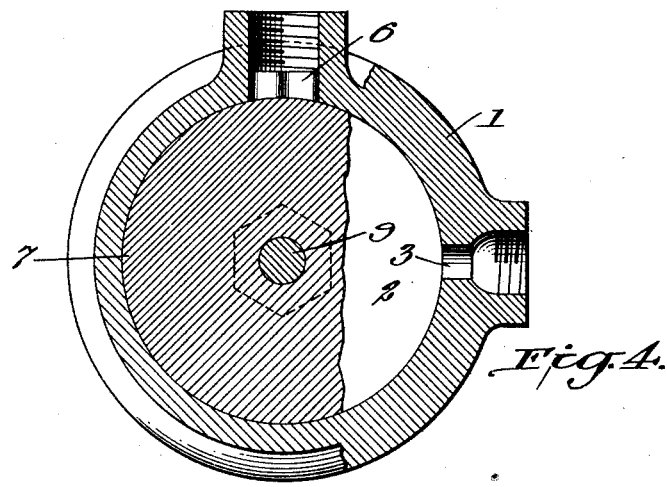
Figure 5:
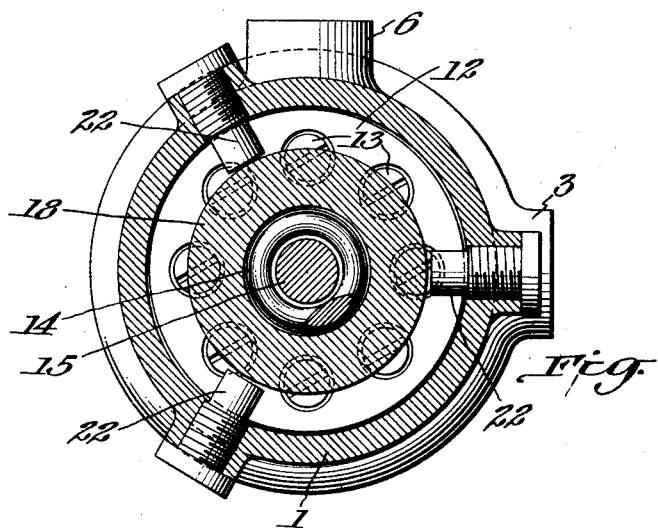

Figs. 4 and 5 are horizontal sections taken on lines 4—4 and 5—5, respectively, of Fig. 1.

In the drawings, the numeral 1 indicates a cylindrical valve casing providing an inlet chamber 2 with which an inlet port 3 is in continuous communication. An outlet port 4 is provided in the end wall 5 of the casing and a relief port 6 is provided in the casing wall at a higher level than that of the top of the inlet port 3. As shown in dotted lines in Fig. 1, the lower edge of the port is preferably given an open V or inverted triangle shape.

The upper wall of the inlet chamber 2 is formed by a piston 7 which has a lower portion fitting snugly within the cylindrical casing and serving as a valve for cooperation with relief port 6. A valve 8 for cooperation with the outlet port 4 is provided with a threaded stem 9 which is fixed to the piston 7 by a lock nut 10. The upper portion of the piston 7 is preferably of reduced diameter for receiving the cupped packing 11 which is secured to the piston by plate 12 and screws 13.

The valve stem 9 is so adjusted in the piston 7 that the outlet port 4 is closed by valve 8 before the inlet port 3 is obstructed, and the relief port 6 is so arranged that an appreciable travel of the piston takes place between the opening of the outlet port 4 and the opening of the relief port. The piston 7 is continuously subjected to the inlet pressure which tends to move the valves towards open position. To prevent the opening of outlet port 4 when the inlet pressure is less than a predetermined valve, a spring 14 is arranged in the upper part of the casing 1 and with its lower end bearing on the shouldered extension 15 of the piston. The upper end of the spring bears against a floating seat 16 and presses the latter against an adjusting bolt 17. The bolt 17 is not carried directly by the casing 1 but is mounted in the upper end of a cap or follower 18 which has a radial fin or flange 19 adjacent its lower end. A second spring 20 is seated between the upper edge of the shoulder 19 and the cap 21 which is threaded upon the upper end of the valve casing. The downward movement of the follower is limited by a plurality of stops 22 which are threaded into the casing wall and lie below the lower surface of the shoulder 19. The follower 18 has a portion 23 extending below the flange 19 and lying in the path of movement of the piston 7 when the latter approaches the position to open the relief port. The portion 23 of the follower preferably fits snugly over the shouldered extension 15 on the piston to provide a guide for the latter. A vent 24 is provided in the top of the follower to relieve the air pressure within the same.

In operation, fluid is supplied through the inlet port 3 and the fluid pressure within the chamber 2 tends to raise the piston. When the pressure is above a certain minimum which is determined by the adjustment of the screw 17, the piston is raised against the pressure of spring 14 and the valve 8 is moved to open the outlet port 4. As the inlet pressure of the fluid increases the displacement of the piston 7 is correspondingly increased. Before the relief port opens, however, the plate 12 on the piston 7 contacts with the extension 23 of the follower 18 and thereafter the further movement of the piston is opposed by spring 20, as well as spring 14. The stress in the spring 20 varies with the adjustment of the cap 21 and is so regulated that the opening of the relief port is initiated as the pressure within the chamber rises to a predetermined maximum value. Due to the rapid increase in cross-section of the relief port for a relatively small movement of the piston, relatively large quantities of fluid are by-passed from the chamber when the pressure rises materially above the predetermined value.

When used in the supply line to a fuel burner, the spring 14 may be adjusted to effect a closing of the outlet port when the pressure falls below say ten pounds. The spring 20 will be adjusted to prevent the opening of the relief port until the pressure rises to a materially higher value, say fifty to one hundred pounds.

While I have described the operation of the invention as used in a fuel supply line, it is obvious that the invention is not limited thereto, as the combined cut-off and relief valve may be used for controlling the supply of fluids in other systems.

For convenience of description in the specification and claims, reference has been made to the relative position of the parts as illustrated in Fig. 1, but it is obvious that the operation of the device is not dependent upon this particular arrangement of the casing with the axis of the cylindrical casing in vertical position and the outlet port below the adjusting cap. The various parts, their relative size, shape and arrangement, are subject to considerable modification without departing from the spirit of my invention as set forth in the following claims.

I claim:

1. A combined cut-off and relief valve comprising a casing having an inlet port, an outlet port and a relief port, an outlet valve and a relief port valve, said valves being urged from their respective closing positions by the inlet fluid pressure, means providing a relatively low force opposing the opening of said outlet port and means providing a relatively large force opposing the opening of said relief port.

2. A combined cut-off and relief valve as specified in claim 1, wherein said valves are connected for simultaneous movement and said outlet and relief ports are so arranged that a material travel of the valve assembly takes place between the opening of the outlet and relief ports.

3. A combined cut-off and relief valve comprising a casing having an inlet port, an outlet port and a relief port a valve assembly having portions thereof for cooperation with said outlet and said relief ports, said portions being so arranged that a material travel of the assembly takes place between the opening of said outlet and said relief ports, means subjected to the inlet fluid pressure and tending to move said valve assembly into port opening position, yielding means continuously urging said assembly toward port closing position, and additional yielding means operative to supplement said first yielding means when said assembly approaches a position in which the relief port would be opened.

4. A combined cut-off and relief valve as set forth in claim 3, wherein each of said yielding means comprises a spring, and means is provided for relieving the valve assembly from the stress of said additional yielding means when the assembly is not in position to open said relief port.

5. In a control valve, a casing providing an inlet chamber, an inlet port in continuous communication with said chamber, an outlet port and a relief port, a piston subject to the pressure within said chamber, means operable by the movement of said piston for effecting the serial opening of said outlet port and said relief port, a spring continuously urging said piston toward port closing position, and a second spring supplementing said first spring after the outlet port is opened and before the relief port opens.

6. A valve comprising a cylindrical casing providing an inlet chamber at one end thereof, an inlet port in continuous communication with said chamber, an outlet port and a relief port, a piston in said chamber and subject to inlet fluid pressure, valve means on said piston for serially opening said outlet and relief ports, the arrangement of the ports and valve means being such that an appreciable travel of the piston takes place between the respective openings of the said ports, a spring within said casing and opposing the opening movement of said piston, a second spring carried by said casing, a follower subject to the pressure of said second spring and lying in the path of movement of said piston, and stop means limiting the range of movement of said follower, said stop means relieving said piston from the pressure of said second spring except when the piston approaches a position corresponding to the opening of the relief port.

7. A valve comprising a cylindrical casing providing an inlet chamber having an inlet port near one end thereof, an end wall for said casing having an outlet port therein, a piston in said casing, a valve carried by said piston and closing said outlet port before the inlet port is obstructed by said piston, a relief port in said casing wall above said inlet port and adapted to be uncovered by said piston after the latter has traveled an appreciable distance from its outlet port opening position, a follower within said casing above said piston, a spring between said follower and piston, a second spring between the upper end of said casing and said follower, and stop means limiting the downward movement of said follower.

In testimony whereof, I affix my signature.

WILLIAM SCRIMGEOUR.